United States Patent [19]

Lieb

[11] Patent Number: 4,662,910

[45] Date of Patent: May 5, 1987

[54] DEVICE FOR REMOVING PARTICULATES FROM A GAS STREAM

[76] Inventor: Christian Lieb, 501 E. Terrace Dr., Sutton, Nebr. 68979

[21] Appl. No.: 829,952

[22] Filed: Feb. 18, 1986

[51] Int. Cl.⁴ .............................................. B01D 45/06
[52] U.S. Cl. ...................................... 55/276; 55/319; 55/344; 55/461; 55/472
[58] Field of Search .................. 55/276, 319, 342–344, 55/418, 461, 467, 472

[56] References Cited

U.S. PATENT DOCUMENTS

| | | | |
|---|---|---|---|
| 319,457 | 6/1885 | Colville | 55/461 |
| 821,819 | 5/1906 | Neumann | 55/461 X |
| 1,147,463 | 7/1915 | Ulrici | 55/418 |
| 1,851,819 | 3/1932 | Duckham | 55/319 |
| 1,887,768 | 11/1932 | Maloney . | |
| 2,172,133 | 9/1939 | Thuillard | 55/319 X |
| 3,077,714 | 2/1963 | McIlvaine | 55/461 X |
| 3,204,394 | 9/1965 | Kaufmann et al. | 55/461 X |
| 3,336,884 | 8/1967 | Fix et al. . | |
| 3,448,704 | 6/1969 | Dvirka . | |
| 3,489,109 | 1/1970 | Flowers, Jr. . | |
| 3,509,932 | 5/1970 | Chambers | 55/461 X |
| 3,616,627 | 11/1971 | Everett et al. | 55/467 X |
| 3,771,292 | 11/1973 | Hamilton et al. | 55/461 X |
| 3,887,032 | 6/1975 | Harris | 55/319 X |
| 3,966,438 | 6/1976 | Nicholson | 55/461 X |
| 4,179,340 | 12/1979 | Limberg et al. | 55/461 X |
| 4,268,288 | 5/1981 | Coombs | 55/472 X |

FOREIGN PATENT DOCUMENTS 79605  11/1955  Netherlands ........................ 55/461

Primary Examiner—Robert Spitzer
Attorney, Agent, or Firm—Watson, Cole, Grindle & Watson

[57] ABSTRACT

A device for removing particulates from a gas stream includes a receptacle and a duct assembly located at least partially within the receptacle. The duct assembly has an inlet duct communicating with a first velocity-reduction zone which includes first and second ducts branched from the inlet duct. The assembly also includes a second velocity-reduction zone communicating with the first zone and with a chamber, the second velocity-reduction zone includes a branched third and fourth ducts branched from a duct of the first zone.

15 Claims, 2 Drawing Figures

DEVICE FOR REMOVING PARTICULATES FROM A GAS STREAM

The present invention relates generally to devices for removing particulates from a gas stream, and more particularly, to such devices which utilize a two-stage velocity reduction combined with directional changes to help remove particulates from the gas stream.

BACKGROUND OF THE INVENTION

A wide variety of devices are known for removing particulates from a gas stream. The most common form of such devices generally utilize some type of filtering means to physically entrap the particulates and thereby remove them from the gas stream. A drawback of these devices is that the filtering means must be periodically cleaned or replaced.

Another widely used type of devices for removing particulates from a gas stream is a cyclone type separator where the particulate-laden gas stream enters a cylinder or conical chamber tangentially at one or more points and exits through a central opening. The particulates, by virtue of their inertia, tend to move toward the entire wall of the chamber where they are collected. While a cyclone type separator generally operates with high efficiency, collection of larger particulates generally subjects the separator to relatively high wear due to abrasion. In addition, relatively high gas velocities are generally required.

SUMMARY OF THE INVENTION

It is therefore a feature of the present invention to provide a device for removing particulates from a gas stream which does not utilize filtering means.

It is another feature of the present invention to provide a device for removing particulates from a gas stream which includes at least two velocity-reduction zones, at least one of the zones having means for changing the direction of the gas stream.

Briefly, the invention in its broader aspects comprehends a device for removing particulates from a gas stream, the device including a receptacle and a duct assembly at least partially within the receptacle, the duct assembly comprising an inlet duct communicating with a first velocity-reduction zone comprising first and second ducts branched from the inlet duct, a second velocity-reduction zone communicating with the first zone and with a chamber, the second velocity-reduction zone comprising a branched third and fourth ducts branched from a duct of the first zone.

Further objects, advantages and features of the present invention will become more fully apparent from a detailed consideration of the arrangement and construction of the constituent parts as set forth in the following description taken together with the accompanying drawing.

DESCRIPTION OF THE PREFERRED EMBODIMENTS

Figure 1:
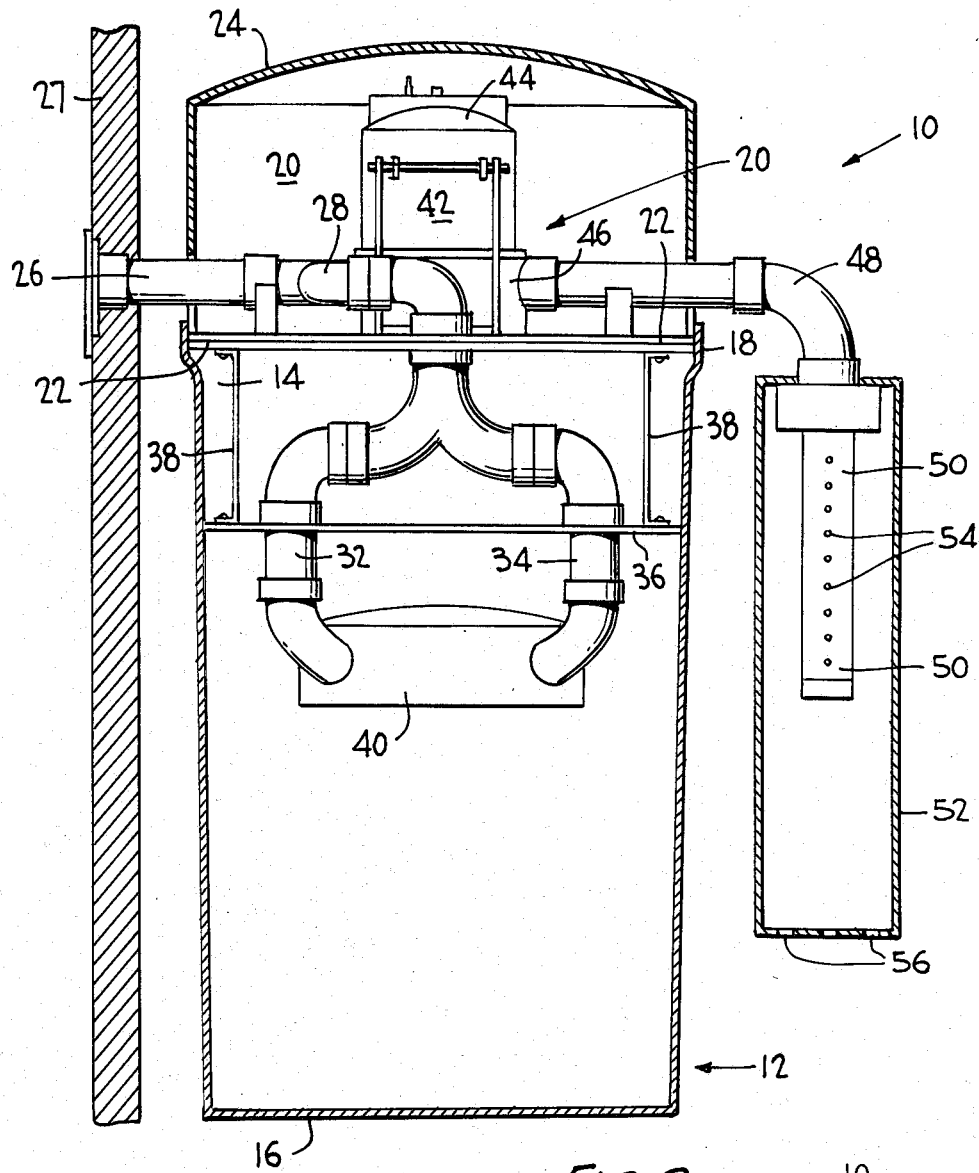
FIG. 1 is a side view, partially in section, of one embodiment of a device according to the invention.
Figure 2:
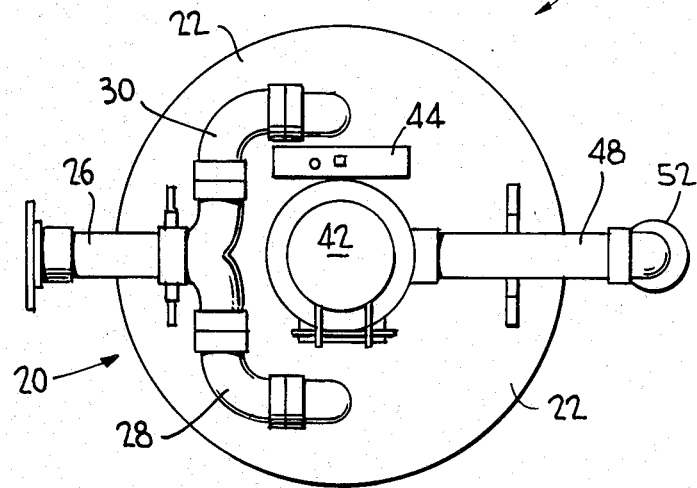
FIG. 2 is a top view of the device shown in FIG. 1 with the protective cover removed.

Referring now to FIGS. 1 and 2, shown is one embodiment of a device 10 for removing particulates entrained in a gas stream constructed in accordance with the present invention. Device 10 includes receptacle 12 of generally cylindrical shape having an open top 14 and a closed bottom 16. Open top 14 includes outwardly extending flanged portion 18 which supports duct assembly 20 by engaging the outer periphery of support disk 22 forming a portion of the assembly. Protective cover 24 is over the upper portion of duct assembly 20 and is supported by the upper surface of support disk 22.

Duct assembly 20 of device 10 comprises inlet duct 26 leading from a source of gas containing entrained particulates. In FIG. 1, inlet duct 26 is shown as extending through wall 27 of a conventional building or the like. As is best shown in FIG. 2, inlet duct 26 leads to first velocity reduction zone comprising branched first and second ducts 28 and 30 which extend horizontally in a direction opposed to each other and then pass downwardly through support disk 22 into the interior of receptacle 12. First duct 28 and second duct 30 then each lead to a second velocity-reduction zone comprising two oppositely extending third and fourth branched ducts, only the second zone of the first duct 28 being shown in FIG. 1. Third and fourth ducts 32 and 34 branching from first duct 28, as well as the ducts (not shown) branched from second duct 30, pass downwardly through baffle plate 36 suspended from support disk 22 by brackets 38, and then extend into chamber 40. Chamber 40 has generally cylindrical side walls, a closed dome-shaped top and an open bottom.

Securely mounted on the upper surface of support disk 22 is electric motor 42 having control box 44 and associated fan 46 operatively connected to the motor. Fan 46 is in communication with the interior of receptacle 12 through an aperture (not shown) in support disk 22 and has exhaust duct 48 extending therefrom through protective cover 24 to communicate with the interior of exhaust reducer 50 contained within exhaust reducer cover 52. Exhaust reducer 50 comprises a closed end cylindrical body having a plurality of holes 54 extending along its length. Cover 52 is also cylindrically shaped and includes a plurality of exhaust apertures 56 at the end opposed to the end engaging exhaust reducer 50.

Preferably, receptacle 12 and cover 16 are of metallic material and for economic reasons, ducts 26, 28, 30, 32 and 34 are of a polymeric material. Support disk 22 may be of wood, plastic, metal or the like and preferably chamber and exhaust reducer cover 52 are also of polymeric material.

In operation, of device 10, motor 42 is started thereby causing fan 46 to create reduced pressure within receptacle 12 and a flow of gas through inlet duct 26 and through the successive ducts to chamber 40. Because of the several branches in the duct work between inlet duct 26 and chamber 40, the gas flow rate is significantly reduced from the inlet duct to the chamber, and as a consequence, any particulates entrained in the gas tend to separate from the main gas flow and collect in the bottom of the receptacle. Furthermore, the action of the gas stream in changing direction several times before exiting into chamber 40 and thus the gas will impinge on interior surfaces a plurality of times which also tends to remove particulates from the gas stream. Gas exits the receptacle 12 through fan 46, exhaust duct 48 and exhaust reducer 50 and is finally exhausted to atmosphere at the bottom of exhaust reducer cover 52.

Preferably, device 10 is utilized in connection with a flexible hose (not shown) which is connected to inlet duct 26 such that, when the device is in operation, one can remove ashes and the like from a fireplace within a home and deposit them in receptacle 12 for subsequent disposal. Thus, the oftentimes dirty and time-consuming task of cleaning the debris in a fireplace can be accomplished easily and with little or no inconvenience.

Alternatively, device 10 could be connected with the exhaust stack of a source of ash particulates so as to remove these particulates from the exhaust gases prior to their release to the atmosphere. Thus, the device could help prevent the release of potentially harmful pollutants into the air. In this use, the operation of fan 46 to draw gas through device 10 may not be necessary depending upon the particular application.

While there has been shown and described what is considered to be preferred embodiment of the present invention, it will be obvious to those skilled in the art that various changes and modifications may be made therein without departing from the invention as defined in the appended claims.

It is claimed:

1. A device for removing particulates from a gas stream, the device including a receptacle and a duct assembly at least partially within the receptacle, the duct assembly comprising an inlet duct communicating with a first velocity-reduction zone comprising first and second ducts branched from the inlet duct, a second velocity-reduction zone communicating with the first zone and with a chamber, the second velocity-reduction zone comprising a branched third and fourth ducts branched from a duct of the first zone.

2. A device in accordance with claim 1, wherein the ducts of the first velocity-reduction zone change in direction.

3. A device in accordance with claim 2, wherein the ducts of the second velocity-reduction zone change in direction.

4. A device in accordance with claim 2, wherein the chamber has cylindrical walls, a dome-shaped top and an open bottom.

5. A device in accordance with claim 1, wherein the chamber has an open bottom.

6. A device in accordance with claim 5, wherein the chamber has cylindrical walls and a dome-shaped top.

7. A device in accordance with claim 1, wherein the duct assembly includes a support closing an opening on the receptacle and a fan communicating with the interior of the receptacle and capable of drawing gas from the receptacle into an exhaust duct.

8. A device in accordance with claim 7, wherein the fan is driven by an electric motor.

9. A device in accordance with claim 7, wherein the duct assembly further includes an exhaust reducer.

10. A device in accordance with claim 9, wherein the duct assembly rurther includes a cover about the exhaust reducer.

11. A device in accordance with claim 7, wherein the duct assembly further including a baffle plate positioned within the receptacle and between the chamber and the support.

12. A device in accordance with claim 11, wherein the baffle plate is suspended from the support by one or more brackets.

13. A device in accordance with claim 1, wherein the duct assembly further including a protective cover about a portion of the duct assembly and supported by the receptacle.

14. A device in accordance with claim 13, wherein the protective cover is supported by a flange on the receptacle.

15. A device in accordance with claim 1, wherein the duct assembly further including a baffle plate positioned within the recebtacle between the inlet duct and the chamber.

* * * * *